Figure 1:
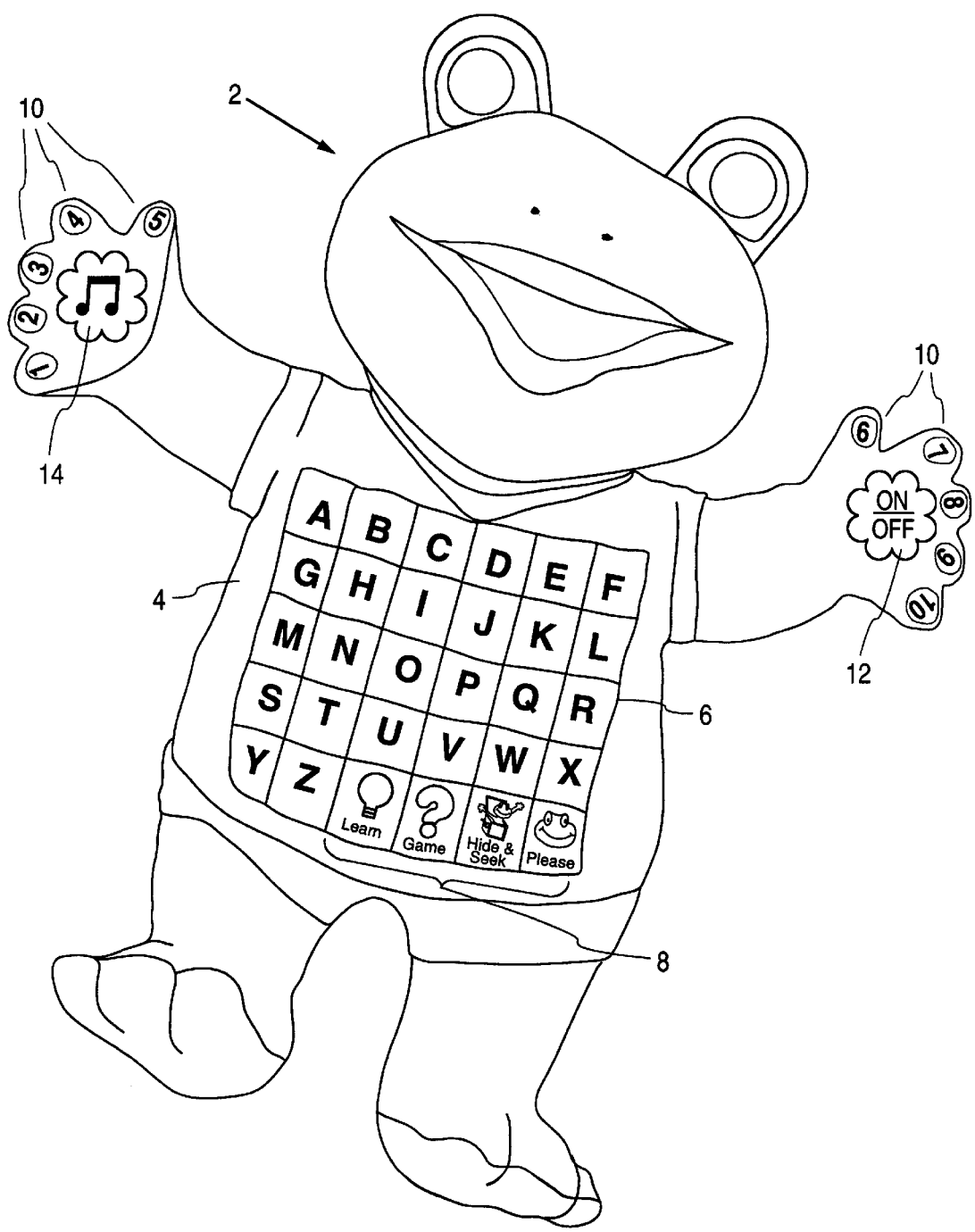

United States Patent [19]
Wood

[11] Patent Number: 5,944,533
[45] Date of Patent: Aug. 31, 1999

[54] INTERACTIVE EDUCATIONAL TOY

[75] Inventor: Michael C. Wood, Orinda, Calif.

[73] Assignee: Knowledge Kids Enterprises, Inc., Emeryville, Calif.

[21] Appl. No.: 09/095,492

[22] Filed: Jun. 10, 1998

[51] Int. Cl.⁶ ........................................ G09B 3/00
[52] U.S. Cl. .................... 434/322; 434/167; 434/169; 434/327
[58] Field of Search .................... 434/335, 169, 434/327; 84/470; 446/302, 143, 297, 298, 369

[56] References Cited

U.S. PATENT DOCUMENTS

| | | | |
|---|---|---|---|
| 3,593,433 | 7/1971 | Dillon | 446/302 |
| 3,949,488 | 4/1976 | Welch | 446/302 |
| 3,977,292 | 8/1976 | Favilli | 84/470 |
| 4,997,374 | 3/1991 | Simone | 434/335 |
| 5,188,533 | 2/1993 | Wood | 434/169 |
| 5,478,240 | 12/1995 | Cogliano | 434/327 |

*Primary Examiner*—Robert A. Hafer
*Assistant Examiner*—Bena B. Miller
*Attorney, Agent, or Firm*—Coudert Brothers

[57] ABSTRACT

The present invention comprises a teaching toy that invites a child's interaction using an attractive play figure, for example a stuffed animal, to present more than one instructional modality in mixed formats. The child is presented with a declarative instruction, quizzing, and logical connections are induced in the child's mind via problem solving games, songs, and visual stimuli. Particularly, the present invention teaches and reinforces a child's knowledge of letter names, letter phonetics, colors, numbers, and social manners by use of visual, audial, and kinesthetic involvement of the child. If the inventive is presented in the form of a stuffed animal, the exterior of the animal would have a plurality of indicia that the child could press. The indicia is connected to switching circuitry and those switches activate a logic circuit containing preprogrammed instruction modalities and play methods. The instruction modalities are communicated using a variety of preprogrammed fun speech patterns so that the toy appears to talk to the child and provide instruction. Each inventive toy presents least two distinct instruction modalities, for example, i) stating the name of a symbol and ii) querying a name of a symbol and providing response as a function of the answer given.

24 Claims, 3 Drawing Sheets

INTERACTIVE EDUCATIONAL TOY

I. BACKGROUND OF THE INVENTION

1. Field of the Invention

This invention relates generally to early stage learning skills and more specifically to learning phonetics, number skills, and social skills.

2. Description of Related Art

Repetition is an important teaching tool. To teach a child effectively, repetition must be made interesting and fun. There are a large number of educational toys that attempt to engage a child's interest and to teach the child any of a variety of concepts by virtue of the child's play with the toy. These toys however are geared to single format learning. Typically toys implement a particular instructional modality and use it exclusively.

For example, in U.S. Pat. No. 5,376,038, issued to Avi Arad, a doll is disclosed that has electronic switches located in the hands, feet, nose, lips, and other body parts of the doll. When a child presses the switch in, for example the hand, the doll appears to speak the word, "Hand". An adult can adjust a programming switch that changes the complexity of speech so that the doll appears to say the words, "Hold my hand" instead of only saying the word, "hand". Arad's doll, however, not only requires intervention of an adult for full operation, it operates only the format of saying a word or phrase in response to activation of a switch in a particular body part. The Arad educational toy is based on the presumption that the child will learn to associate the word with the body part in which the switch is pressed. Arad's educational toy provides the user with only a single instruction modality wherein a name is provided for a body part.

U.S. Pat. No. 5,372,511, titled "Educational Toys", by C. W. Keung discloses a two dimensional board on which objects shaped like household items, domestic pets, or letters can be placed. Sensing and switching devices on the board activate speech synthesis circuits that say the name of the object, such as "dog", "A", or the name of a number. Again in this device the format is constant. The child sets an object that is provided as part of the toy down on a sensing board, and a preprogrammed voice synthesizer provides the name the object represents. While the toy is interactive, it is presented as a tablet style learning tool, a device to be used in desk fashion instead of as a play object, and only a single instruction modality, the naming of an object, is presented.

A toy that is available on the market, titled "What Am I", a Golden Book™ product (Western Publishing Co. Inc.; 1220 Mound Ave.; Racine, Wis. 53404) presents a slightly different format. It presents the child with a 6×6 array of cartoon representations of various unrelated objects, for example, a bus, a bird, a spoon, a cake, a roller skate, etc. The child is asked to guess what object is in the 'mind' of the toy, with the voice synthesized question, "What am I?". Upon pressing a random first square, the child is told, "I am bigger than that", or "I am smaller than that", or "I am a different color", etc. The objects are functionally unrelated. It often takes users, including adults, many tries to get a correct answer, causing frustration. Also the child must have a very clear idea of what the object is before playing the game because the object representations are all the same size. In the cartoons, a house, a spoon, a cat, and an apple are all represented with the same size picture. As with the other toys, the format is invariable. Only one instruction modality is presented. Additionally there are a very few number of phrases and tunes used.

Ideally, a teaching toy would provide an inviting format for interaction and would combine instruction with quizzing and logic to engage all portions of a child's interactive capability. Learning is best achieved when at least three physical modalities are logically connected and engaged: audio, visual, and kinesthetic. Instruction is best reinforced when both recognition and recall memory is engaged. In addition, combining declaratory instruction with rhythmic songs, direct simple quizzing, inducing logical connections, and providing a social environment all serve to enhance learning. It would be very desirable to have a toy that was attractive to a child simply as a toy and that further provided instruction using a combination of presentation formats and instructional modalities.

II. SUMMARY OF THE INVENTION

It is an object of this invention to provide a teaching toy that invites a child's interaction using more than one instructional modality in a mixed format presentation, including declarative instruction, quizzing, and induction of logical connections in the child's mind via problem solving games, songs, and visual stimuli. It is a further object of the present invention to teach and reinforce a child's knowledge of letter names, letter phonetics, colors, numbers, and social manners by use of visual, audial, and kinesthetic involvement of the child and by use of mixed instruction modalities.

The present invention is an interactive learning device comprising, a) a figure attractive to children, the figure having an exterior surface; b) a plurality of indicia on the exterior surface of the figure; c) switching circuitry electrically connected to the indicia; and d) a logic circuit having at least one memory and having its input terminals connected to the switching circuitry and its output terminals connected through other circuit elements to a sound synthesizer and speaker; wherein the logic circuitry controls interaction between the switching circuitry and a plurality of preprogrammed instruction modalities including at least two distinct instruction modalities.

III. SUMMARY DESCRIPTION OF THE DRAWINGS

FIG. 1: illustrates one embodiment of the present invention, in the form of a plush animal, having indicia on its vest and hands and a plurality of instruction modalities in internal circuitry.

Figure 2:
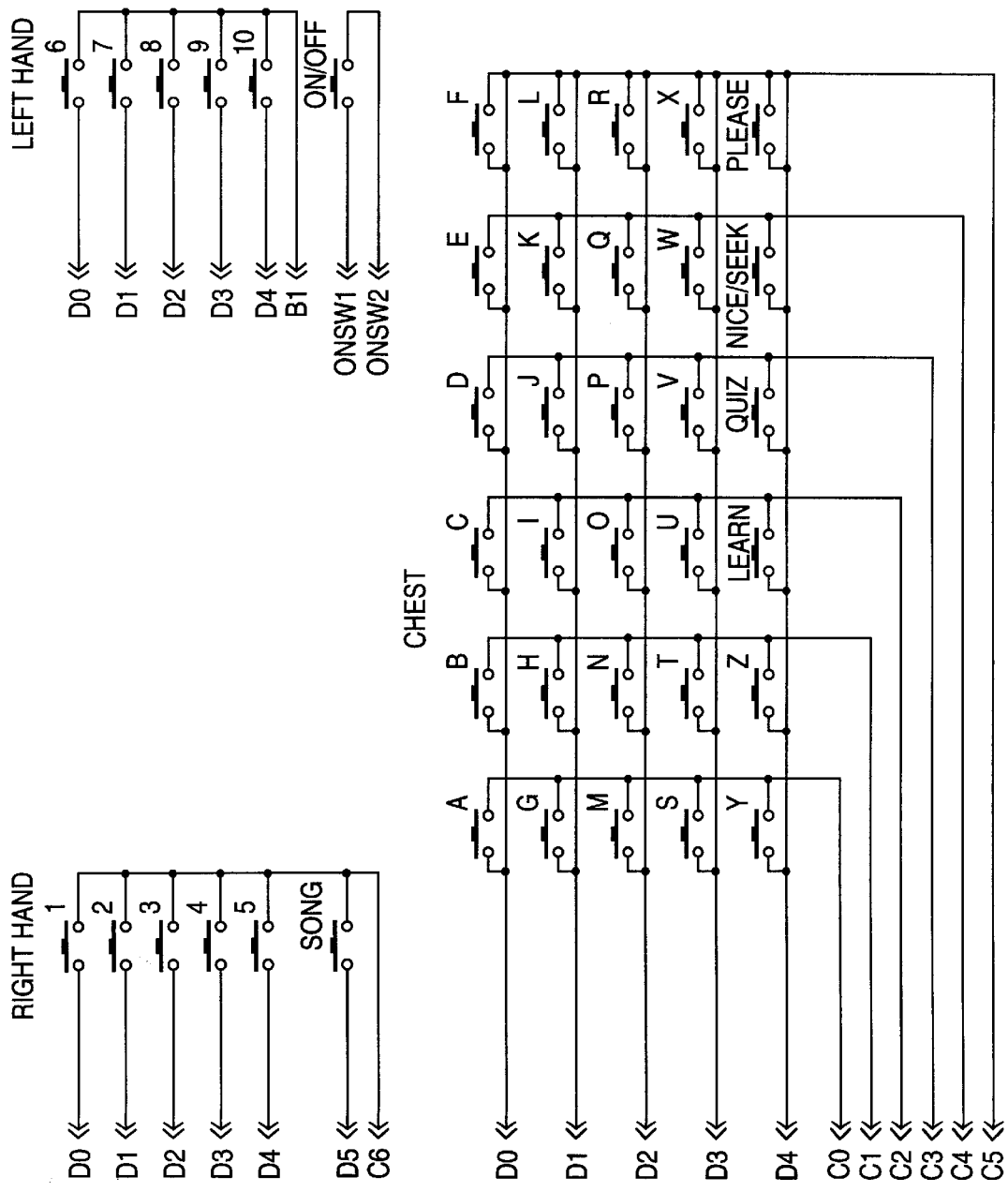

FIG. 2: is a schematic diagram of one embodiment of switch circuitry connected to the inner surface of the indicia.

Figure 3:
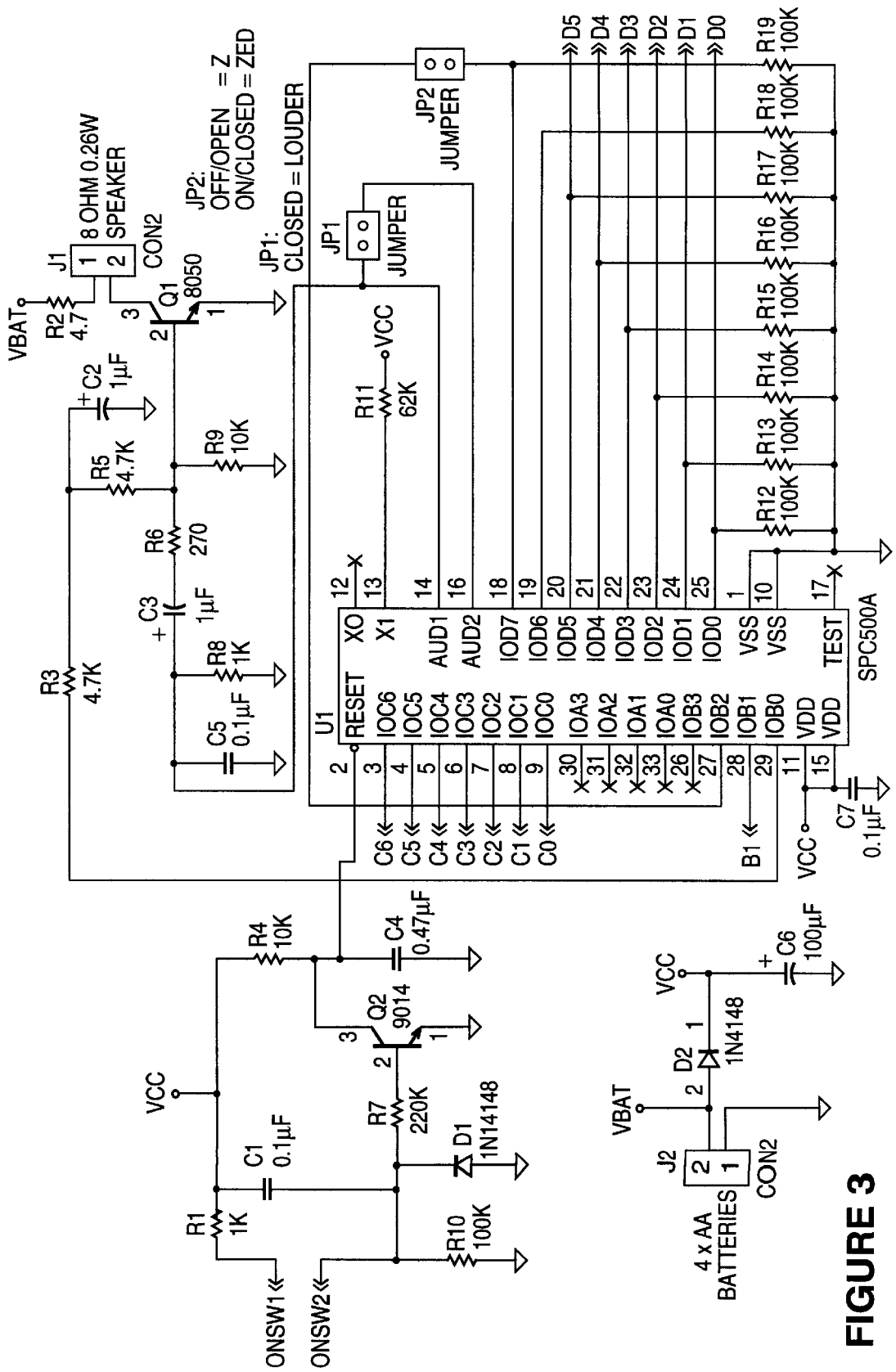

FIG. 3: is a schematic diagram of one embodiment of logic circuitry that controls a plurality of preprogrammed instruction modalities.

IV. DETAILED DESCRIPTION OF THE INVENTION

The present invention is an interactive learning device comprising, a) a figure attractive to children, the figure having an exterior surface; b) a plurality of indicia on the exterior surface of the figure; c) switching circuitry electrically connected to the indicia; and d) a logic circuit having at least one memory and having its input terminals connected to the switching circuitry and its output terminals connected through other circuit elements to a sound synthesizer and speaker; wherein the logic circuitry controls interaction between the switching circuitry and a plurality of preprogrammed instruction modalities including at least two distinct instruction modalities.

The present invention is an apparatus and method for teaching children basic symbolic concepts. The name of a symbol is taught; the meaning of the symbol is taught; and the use of the symbol in context is taught. The inventive learning apparatus is designed to teach these principles using audial, visual, and kinesthetic cues and by engaging the child in recognition tasks and in recall tasks. While performing one task, that is, while engaged in playing a game that targets one learning skill, other concepts are reinforced.

To engage the child, the apparatus is embodied in a figure that appeals to a child. The figure may be a plush figure that invites touching and feeling or a figure that holds other interest for the child. Examples of plush figures include those in the shapes of household pets, cartoon figures, human figures, or hybrid fantasy designs. Examples of other figures that may hold a child's interest include household articles like a telephone. The figures described above only provide illustrative examples and the inventive figure is not limited to these examples.

Indicia is applied to the figure in a fashion that is easy for a young child of about 2 years or older to grasp and push. For example an array of indicia comprising alphabet letters may be attached to the chest of the figure. Indicia comprising numbers may be attached to the figure's fingers or toes and indicia comprising an 'On/Off' function, or song function may be attached to the figure's palms. Additionally, function indicia that initiate different learning or play modes by activating instruction modalities would beneficially be located in an easy to reach place, for example on the chest of the figure.

A declaratory instruction modality is useful in teaching young children the names of letters and the sounds represent. The child presses a letter and hears it's name said, or presses a letter and hears what sounds the letter represents. To reinforce age what the child has learned, a second quizzing instruction modality is useful. The name of a letter is said and the child is asked to press the correct letter. The child's newly learned fact is reinforced by stimulating recognition recall. Another useful instructional modality for teaching letters is to use a song, such as the traditional "ABC" song. The child learns connections quickly when s/he can see the alphabet in front of him/her as the song is sung. Learning is reinforced if the song stops suddenly and the child is asked to press the next letter in the song. It is important that the instructor does not loose patience with the child if the answer is wrong, and encourages the child to make several more attempts at the correct answer before providing it. Yet another important instruction modality comprises using newly mastered knowledge in a logic based paradigm, which further keeps the attention of the child and reinforces the new learning.

Names of numbers are similarly advantageously taught by combined instruction modalities. Among the many educational games and toys available, none were found having two or more of the key elements. Elements key to educating a small child with a toy include, i) that the child is attracted to the toy independently of the toy's educational function, ii) that the child is engaged by more than one instructional modality, and iii) that the child can choose the modality of interest. It is best when a number of these elements are combined in a toy.

Using an object a child perceives as a toy independently of its teaching function, the present invention combines the above-described instruction modalities and other instruction modalities to teach children the concept that letters both have names and represent sounds. Further, by using colored letters and numbers, the present invention reinforces what the child already knows about colors. For example, in one response to a child pressing the letter D, the inventive educational figure replies, "Thank you! That's the green letter D that says Duh", thus reinforcing the child's knowledge of color. In response to an incorrect answer, the inventive toy may ask, "Need a clue? The letter is blue. Please press the blue letter M". Thus the toy uses and reinforces the child's knowledge of colors.

FIG. 1 shows a diagram of one embodiment of the inventive educational toy. The figure in this embodiment is that of a plush frog 2. In one embodiment the frog is sized about one and a half feet high and a bit over one foot wide. The frog is named Little Leap after the game of leap frog. The toy is made from a soft colorful fabric that is pleasant to touch, and has a cuddly appearance.

Little Leap 2 has a vest 4 that contains a 5×6 matrix 6 on which the alphabet is represented using letter indicia. Each letter is a solid color. In this embodiment four different colors were used. In the last row, four red squares contain instruction modality indicia 8. Little Leap's fingers have number indicia on them 10, reminiscent of counting on one's fingers. An 'On/Off' function indicia 12 is located on the left palm and a musical indicia 14, for example a musical note, is located on the right palm.

In this embodiment a pressure sensitive switch is located behind each letter, number, or function indicia. The switches are connected to switching circuitry which in turn provides input to a logic circuit. The switching circuitry for one embodiment of the inventive educational toy is shown in FIG. 2. FIG. 3 shows one embodiment of the logic circuitry that activates the plurality of instructional modalities as appropriate to the child's use.

Preprogrammed instruction modalities are stored in one or more memories in the logic circuit or an associated microprocessor. Different instructional modalities are activated depending on which function indicia is pressed. If no modality is choosen, the toy defaults to the simplest modality. The art of activating different programs in memory via switching means, and driving speech chips according to the choosen program is well known by those of ordinary skill in the art of electronics for toys. The present invention does not lie in the specific implementation of the electronic circuit logic.

To begin instructive play, the figure's left hand is squeezed activating the switch behind 'on/off' indicia 12. The figure gives a pleasant giggle and says, "I'm Little Leap. Let's play! Please press a red square to choose a game". The first game is activated by pressing a function indicia that activates one of the instruction modalities, 8. For example, a square with a lightbulb on it begins an 'explore and learn' instruction modality. The child presses a letter on the figure's vest and the letter's name and the sounds, or sounds, it makes is heard. If the numbers on the figure's fingers are pressed, the number's name is pronounced. The child can press the fingers in sequence to hear the figure count in sequence from 1 to 10. If a child forgets to press a red square to select a game, the figure defaults to the 'explore and learn' instruction modality.

A second game is activated by pressing a second function indicia 8. A red square with a "?" symbol on it initiates a question type instructional modality, in which the child uses recognition and recall to answer the question. The figure requests the child finds a letter or number, for example, "Please press the letter R." If the child presses the right letter or number, the figure thanks the child. If the child presses the wrong letter or number, the figure tells the child what s/he pressed, for example, "That is the letter B that says buh!"

This game is combined with an instructional modality on manners. If the figure of Little Leap forgets to say "please" before giving his instruction, the child gets to press the "please" indicia to remind Little Leap of his manners. The figure replies, "Whoops! I forgot to say please. Thanks for the reminder." Any time the child presses the "please" indicia, the figure replies, "It's nice to say please." The figure always says "Thank You" in response to a user's effort.

A third learning modality involves giving logic clues to find a number or letter that the toy figure knows but the child has to figure out. To activate this modality, a third indicia function box is pressed. The Little Leap toy figure says "Find Me". The player presses any letter or number to hear a reasoning clue, such as for a number, "I'm bigger than that, and I'm red", or for a letter, "I come before W and I'm blue".

Alternatively the instruction modality is changed, or the toy may be turned on, by pressing the music indicia 14 on the right hand. The figure will then sing a letter song (e.g., the "ABC" song) or a number song (e.g., "One little, two little, three little Leap Frogs," etc.). When the figure stops singing, the child tries to press the letter or number that comes next. If the child is correct, the figure repeats the letter's or number's name, congratulates the child, then continues singing. If the wrong letter or number is pressed, the figure corrects the error and urges a second try. Eventually the correct answer is provided and the song continues. If the child does not respond when the song stops, the figure prompts the child to find the next number or letter.

At the end of play, the toy is turned off by pressing the On/Off indicia and the figure says "Night, night!". Otherwise, the figure turns off automatically thirty seconds after giving a few prompts to keep playing. A snoring sound is produced to let the player know the toy is about to turn off.

Table 1 shows a complete tabulation of a particular embodiment of the logical relationships between indicia activation and toy response.

TABLE 1

Little Leap Script

Four function buttons:

Game 1 - Learn Letters & Numbers
Game 2 - Alphabet Quiz (with Please) or Number Quiz (with Please)
Game 3 - Hide & Seek Letters or Numbers
PLEASE button
10 Number Button, 1 in each finger.
On/Off button in left palm. Song button in right palm.

| FUNCTION | RECORDINGS |
|---|---|
| Press the ON/OFF button to wake up | (giggle)/I'm Little Leap!/Let's play!/Please press a red square to choose a game! |
| Press the ON/OFF button to turn off | Night night!(unit immediately turns off) |
| Press the SONG button to wake up (from sleep) | (giggle)/I'm Little Leap!/Let's sing!(go to song functionality below) |
| No response after 4 seconds, after pressing ON button | Let's play!/Please press a red square to choose a game! |
| No response after next 4 seconds, after pressing ON button | Come on!/Let's play!/Please press a red square to choose a game! |
| No response after next 4 seconds, after pressing ON button | Night night!(snore sound × 2) |
| Press the Learn button at any time | (Go to Learn mode) |
| Press the alphabet/number quiz button at any time | (Go to Alphabet Quiz or alternately Number Quiz mode) |
| Press the Jack in the Box at any time | (Go to Hide & Seek Letters or alternately Numbers mode) |
| Press the Please button (anytime not in Quiz mode) | It's nice to say please! |
| Press one of the numbers on fingers (1 through 10) in Learn mode or if no game is chosen. | (Recite number name) |
| Press the Song button at any time | Alternately, Little Leap will sing the interactive "ABC's" song or the interactive "1 Little 2 Little 3 Little Leap Frogs" song (see song functionality below) |
| Press any letter in Learn mode or if no game is chosen | (e.g. "B/says/Buh") USE Deidre's speech from the PHONICS BUS. |
| Learn Letters & Numbers Mode | |
| Press Learn button | Please press/a letter or a number! |
| No response after 4 seconds | Please press/a letter pr a number! |
| No response after next 4 seconds | Please press/a letter or a number! |
| No response after another 4 seconds | OK, we'll play later!/Night night!/(snore sound × 2) |
| Press any letter | (e.g. "B/says/Buh") |
| Press any number | (Recite number name) |
| Randomly sneezes or hiccups between requests. | Aaaacchhhhoooooooooooo/(or) Hiccup!/Excuse me! |
| After learning 5 letters or numbers in Learn Mode | You've learned a lot!/if you want to play a game, press the questions mark! |
| Every time after learning 10 MORE letters or numbers | You've learned a lot!/if you want to play a game, press the question mark! |
| Alphabet Quiz Mode | |
| Press quiz button, Alphabet Quiz comes up (alternately, Number Quiz described below). | Let's play!/If I forget to say please, press the PLEASE button!/(half second pause) Please press/the letter/(letter)/that says/(phoneme) |
| No response after 4 seconds | You can do it!/Please press /the letter/(letter)/that says/(phoneme) |
| No response after next 4 seconds | You can do it!/Please press/the letter/(letter)/that says/(phoneme) |
| No response after another 4 seconds | Need clue?/The letter/(letter)/is/(color)./Please press/the/(color)/letter /(letter)! |
| No response after another 4 seconds | OK, we'll play later!/Night night!/(snore sound × 2) |
| Correct response | Thank you!/That's the/(color)/letter/(letter)/that says/(phoneme)!/Please press/the letter/(letter)/that says/(phoneme). |
| Incorrect response | That's the/letter/(letter)/that says/(phoneme). |
| Randomly sneezes or hiccups between requests. | Aaaacchhhhoooooooooooo/(or) Hiccups!/Excuse me! |

TABLE 1-continued

Little Leap Script

| FUNCTION | RECORDINGS |
|---|---|
| Randomly makes a request without saying "Please".(Should come up within first 4 requests in quiz mode!!!) | Press the letter/(letter)/that says/(phoneme) |
| Correct response (no "please") | I forgot to say please!/Let's play again!/(500 ms pause) Please press/the letter/(new letter)/that says/(phoneme) |
| Incorrect response (no "please") | I forgot to say please!/Let's play again!/(500 ms pause) Please press/the letter/(new letter)/that says/(phoneme) |
| Press PLEASE button (after request with no "please") | Whooooops!!/I forgot to say please!/Thanks for the reminder!/Please press/the letter/(previous letter)/that says/(phoneme) |
| After finding 5 letters in Alphabet quiz mode | If you want to play hide 'n seek, press the Jack in the Box! |
| Child doesn't press Jack in the Box | (resume Quiz functionality) Please press/the letter/(letter)/ that says/ (phneme) |
| Every time after finding 10 MORE letters in Alphabet quiz mode | If you want to play hide 'n seek, press the Jack in the Box. |
| Press PLEASE button (no request given) | It's nice to say please! |
| Number Quiz Mode | |
| Press quiz button, Number Quiz comes up (alternates with Letter Quiz) | Let's play!/If I forget to say please, press the PLEASE button!/(half second pause) Please press/the number/(number) |
| No response after 4 seconds | You can do it!/Please press/the number/(number) |
| No response after next 4 seconds | You can do it!/Please press/the number/(number) |
| No response after another 4 seconds | Need a clue?/The number/(number)/is/(color)./Please press/the/(color)/ number/(number) |
| No response after another 4 seconds | OK, we'll play later!/Night night!/(snore sound × 2) |
| Correct response | Thank you!/That's the/(color)/number/(number)!/Please press/the number /(number). |
| Incorrect response | That's the/number/(number). |
| Randomly sneezes or hiccups between requests. | Aaaacchhhhoooooooooooo/(or)Hiccup!/Excuse me! |
| Randomly makes a request without saying "Please". (Should come up within first 4 requests in quiz mode!!!) | Press the number/(number). |
| Correct response (no "please") | I forgot to say please!/Let's play again!/(500 ms pause)/Please press/the number/(new number) |
| Incorrect response (no "please") | I forgot to say please!/Let's play again!/Please press the number (new number) |
| Press PLEASE button (vest on; after request with no "please") | Whooopss!!/I forgot to say please./Thanks for the reminder!/Please press/ the number/(previous number) |
| After finding 5 letters in Number quiz mode | If you want to play hide 'n seek, press the Jack in the Box. |
| Child doesn't press Jack in the Box | (resume Quiz functionality) Please press/the number/(number) |
| Every time after finding 10 MORE Numbers in Quiz mode | If you want to play hide 'n seek, press the Jack in the Box. |
| Press PLEASE button (no request given) | It's nice to say please! |
| Hide & Seek Letters and Numbers | |
| Press Jack in the Box | Let's play!/I'm a mystery letter!/(or/I'm a mystery number/-should alternate randomly between letter and number)/Find me! |
| When searching for a mystery letter: | |
| No response after 4 seconds | I'm a mystery letter!/Find me! |
| No response after another 4 seconds | You can do it!/Take a guess!/Please press/a letter! |
| No response after another 4 seconds | OK, we'll play later!/Night night!/(snore sound × 2) |

| FUNCTION | RECORDINGS |
|---|---|
| Child presses any letter (incorrect response - too far in alphabet and incorrect color) | Here's a clue!/I come before/(letter pressed)/and I'm/(color) |
| Child presses any letter (incorrect response - too far in alphabet, but correct color) | Here's a clue!/I'm the same color, but/I come before (letter pressed). |
| Child presses any letter (incorrect response - too soon in alphabet and incorrect color) | Here's a clue!/I come after/(letter pressed)/and I'm/(color) |
| Child presses any letter (incorrect response - too soon in alphabet, but correct color) | Here's a clue!/I'm the same color, but/I come after (letter pressed). |
| Child presses any number when looking for mystery letter | That's/a number!/I'm a mystery letter! |
| Child presses any letter (incorrect response after 4 tries) | I'll tell you who I am!/I'm the/(color)/letter/(letter name)/that says/ (phoneme). (Two second pause, start Mystery Letter game again) |
| Child presses correct letter | YAY!!!/I'm the/(color)/letter/(letter name)/that says/(phoneme) (Two second pause, start Mystery Letter game again) |
| When searching for a mystery number: | |
| Press Jack in the Box | Let's play!/I'm a mystery number!/Find me! |
| No response after 4 seconds | I'm a mystery number!/Find me! |
| No response after another 4 seconds | You can do it!/Take a guess!/Please press/a number! |
| No response after another 4 seconds | OK, we'll play later!/Night night!/(snore sound × 2) |
| Child presses any number incorrect response - too large of a number and incorrect color) | Here's clue!/I'm smaller than/(number pressed)/and I'm (color) |
| Child presses any number incorrect response - too large of a number, but cprrect color) | Here's a clue! I'm the same color but/I'm smaller than/(number pressed). |
| Child presses any number incorrect response - too small of a number and | Here's a clue!/I'm bigger than/(number pressed)/and I'm/(color) |

TABLE 1-continued

Little Leap Script

| | |
|---|---|
| incorrect color) | |
| Child presses any number incorrect response - too small of a number, but correct color) | Here's a clue!/I'm the same color, but/I'm bigger than/(number pressed). |
| Child presses any letter when looking for mystery number | That's/a letter!/I'm a mystery number! |
| Child presses any letter (incorrect response after 4 tries) | I'll tell you who I am!/I'm the/(color)/number/(number). (Two second pause, resume Mystery Number game) |
| Child presses correct letter | YAY!!!/I'm the/(color)/number/(number) (2 second pause) |
| Song Button Functionality | |
| | |
| Alphabet Song | |
| | |
| Child presses Song button, goes to Alphabet Song (alternate with Numbers Song) | Let's sing!/A/B/C/D/E/F/G/H/I/J/K/LMNOP/Q/R/S/T/U/V W/X/Y/Z/Now I know my ABC's, next time won't you sing with me? |
| RANDOMLY, AT ANY POINT DURING SINGING OF LETTERS, STOP SONG(stop song between 1 and 3 times for each time through) | (e.g., "A/B/C/D/E/F . . .) (stop song) |
| 4 seconds after song has stopped | Please press the letter that comes next! |
| 4 more seconds after song has stopped | You can do it! Please press the letter that comes next! |
| 4 more seconds after song has stopped | You can do it! Please press the letter that comes next! |
| 4 more seconds after song has stopped | OK, we'll play leter!/Night night!/(snore sound × 2) |
| Child pushes correct letter | (SPEAK letter, e.g., "G") YAY!!(continue singing e.g., "G/H/I/J/K . . .") |
| Child pushes incorrect letter | (SPEAK letter, e.g., "K") Actually/(letter)/comes next./Please press/the letter/(letter) |
| Numbers Song | |
| | |
| Child presses Song button, goes to Numbers Song (alternates with Alphabet Song) | Let's sing!/1 little/2 little/ 3 little LeapFrogs/4 little/5 little/ 6 little LeapFrogs/7 little/ 8 little/9 little LeapFrogs/10 little LeapFrogs leap! |

| FUNCTION | RECORDINGS |
|---|---|
| RANDOMLY, AT ANY POINT DURING SINGING OF LETTERS, STOP SONG (stop song 1 or 2 tmes for each time through) | (e.g., "1 little/2 little . . .")(stop song) |
| 4 seconds after song has stopped | Please press the number that comes next! |
| 4 more seconds after song has stopped | You can do it! Please press the number that comes next! |
| 4 more seconds after song has stopped | You can do it! Please press the number that comes next! |
| 4 more seconds after song has stopped | OK, we'll play later/Night night!/(snore sound × 2) |
| Child pushes correct number | (SPEAK number, e.g., "3")YAY!!(continue singing, e.g., "3 little leapfrogs/4 little/5 little . . .") |
| Child pushes incorrect number | (SPEAK number, e.g., "7") Actually/(correct number)/comes next./Please press/the number/(correct number) |
| Song functionality resumes | Let's sing again!(begins whichever song it did NOT sing last) |

In summary, the inventive educational toy and method, combines several different instructional modalities that can be selected at the will of the player. The different modalities use proven pedagogical instruction modalities: declarative audial instruction reinforced by kinesthetic activity; use of recall memory validated by commentary or encouraged by clues; corollary reinforcement of already learned facts such as color names; necessary social skills such as saying please and thank you; and the use of rhyme and rhythm, through song, to aid in teaching via the use of statements and queries. The present inventive toy fills a child's need for a simple plush toy and also teaches by both making an assertion in response to an indication by the player (That's the letter B that says Buh) and by asking a question and validating the answer. The toy further induces the player to provide the right answer by prompting, "Please press the letter B that says Buh"; "Need a clue? The letter is blue. Please press the blue letter B". In addition to these instruction modalities, the present invention may use at least four other instruction modalities: use of relational logic ("the number is smaller than 7"), use of rhythm and rhyme (through songs), use of recall memory (by supplying a missing element), and use of social skills (by remembering to say please and recognizing when it isn't said).

The description of illustrative embodiments and best modes of the present invention is not intended to limit the scope of the invention. Various modifications, alternative constructions and equivalents may be employed without departing from the true spirit and scope of the appended claims.

I claim:

1. An interactive learning device comprising,
   a) a figure attractive to children, the figure having an exterior surface;
   b) a plurality of indicia on the exterior surface of the figure;
   c) switching circuitry electrically connected to the indicia; and
   d) a logic circuit having at least one memory and having its input terminals connected to the switching circuitry and its output terminals connected through other circuit elements to a sound synthesizer and speaker;
   wherein the logic circuitry controls interaction between the switching circuitry and a plurality of preprogrammed instruction modalities including at least two distinct instruction modalities.

2. The device of claim 1 wherein one instruction modality provides names of the indicia.

3. The device of claim 1 wherein one instruction modality asks a user to identify a named indicia.

4. The device of claim 1 wherein one instruction modality uses the indicia in a song.

5. The device of claim 1 wherein one instruction modality provides information regarding a social skill.

6. The device of claim 1 wherein the plurality of instruction modalities comprise naming the indicia, asking a user to identify named indicia, and reminding a user of a social skill.

7. The device of claim 1 wherein the figure is a plush animal having hands and feet.

8. The device of claim 1 wherein the indicia are located on the animal's hands.

9. The device of claim 1 wherein the indicia are located on the animal's chest.

10. The device of claim 1 wherein the indicia comprise letters.

11. The device of claim 1 wherein the indicia comprise numbers.

12. The device of claim 1 wherein the indicia comprise letters, numbers, and colors.

13. The device of claim 1 wherein some of the indicia connect to switches that select an operative instructional modality.

14. The device of claim 1 wherein the logic circuitry comprises a microprocessor.

15. A plush toy having an exterior and an interior surface, the toy comprising,
   a) a plurality of indicia on the exterior surface of the animal;
   b) switching circuitry electrically connected to the indicia from the interior surface; and
   c) a microprocessor-containing logic circuit having its input terminals connected to the switching circuitry and its output terminals connected through other circuit elements to a sound synthesizer and speaker;
wherein a logic circuitry controls interaction between the switching circuitry and a plurality of preprogrammed instruction modalities including at least one instruction modality that names an indicia, a second modality that asks the user to identify a named indicia and provides appropriate feedback to the user as a function of the user's answer, and a third modality that asks the user to answer questions based on a relationship between the indicia.

16. The device of claim 15 wherein the plurality of preprogrammed instruction modalities further include the use of songs.

17. The device of claim 15 wherein the plurality of preprogrammed instruction modalities further include the use of social skills.

18. The device of claim 15 wherein the indicia comprise letters.

19. The device of claim 15 wherein the indicia comprise numbers.

20. The device of claim 15 wherein the indicia comprise letters, numbers, and colors.

21. A method for teaching the names, functions, and order if any, of indicia comprising the steps of,
   a) providing a toy that is attractive to a child, the toy having an exterior surface;
   b) attaching a plurality of indicia on the toy's exterior surface;
   c) electrically connecting switching circuitry to the indicia; and
   d) electrically connecting the switching circuitry to the input terminals of a logic circuit having at least one memory and having its output terminals connected through other circuit elements to a sound synthesizer and speaker;
wherein the logic circuitry controls interaction between a user's control of at least one switching circuitry and a plurality of preprogrammed instruction modalities including at least two distinct instruction modalities.

22. The method of claim 21 wherein the plurality of instruction modalities comprise one instruction modality that provides an instructional statement regarding the indicia and at least one other instruction modality that provides a question regarding the indicia and provides appropriate feedback to a user as a function of a user's answer.

23. The method of claim 21 wherein the indicia are letters and one of the instruction modalities teaches the names, sounds and order of the letters in the alphabet.

24. The method of claim 21 wherein the indicia are numbers.

* * * * *